A. F. RENKEN.
ANIMAL TRAP.
APPLICATION FILED JULY 29, 1920.

1,392,797.

Patented Oct. 4, 1921.

WITNESSES
Bernard Aebly
Franklin J. Foster

INVENTOR
ANTON F. RENKEN
BY Munn & Co.
ATTORNEYS

UNITED STATES PATENT OFFICE.

ANTON F. RENKEN, OF CRETE, NEBRASKA.

ANIMAL-TRAP.

1,392,797.　　　　Specification of Letters Patent.　　Patented Oct. 4, 1921.

Application filed July 29, 1920. Serial No. 399,683.

*To all whom it may concern:*

Be it known that I, ANTON F. RENKEN, a citizen of the United States, and a resident of Crete, in the county of Saline and State of Nebraska, have invented a new and Improved Animal-Trap, of which the following is a description.

This invention relates to improvements in animal traps, particularly to a trap which is primarily designed to catch pocket gophers. It is customary for the trapper of these animals to insert a trap into the mouth of the gopher hole so that the jaws of the trap nearly fill the hole when the trap is in set position. The holes are of various sizes and it is an object of my invention to provide means for maintaining the trap at various positions of adjustment when the trap is in set position so that it may be suited for use in the holes of different sizes.

A further object is to provide a metal trap which will be simple in construction, and comparatively cheap to manufacture, yet which will be strong, durable and practical in use.

With these and other objects in view, the invention consists in certain novel features of construction and combinations and arrangements of parts as will be more fully hereinafter described and pointed out in the claims.

In the accompanying drawings—

Figure 1:
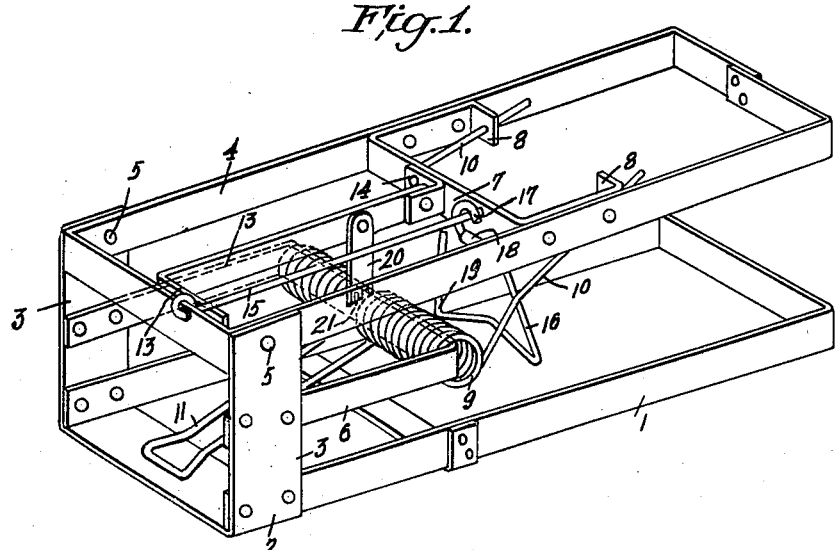
Figure 1 is a perspective view illustrating my improved trap in set position.

Referring in detail to the drawings, the trap comprises a U-shaped base frame 1. A U-shaped member 2 positioned at right angles to the frame 1, is secured to the extremities thereof and the arms 3 of the member 2 form uprights. A rectangular frame 4 has one end pivotally connected to the upper ends of the arms 3 as shown at 5. The frame 1 forms the fixed jaw and the frame 4 the movable jaw of the trap.

An angular bracket 6 has its extremities fixedly secured to the arms 3 of the member 2 between the fixed and movable jaws 1 and 4. A brace 7 of substantially U-shape is secured to the movable jaw 4 with its inwardly bent extremities 8 toward the free end of the jaw.

Figure 3:
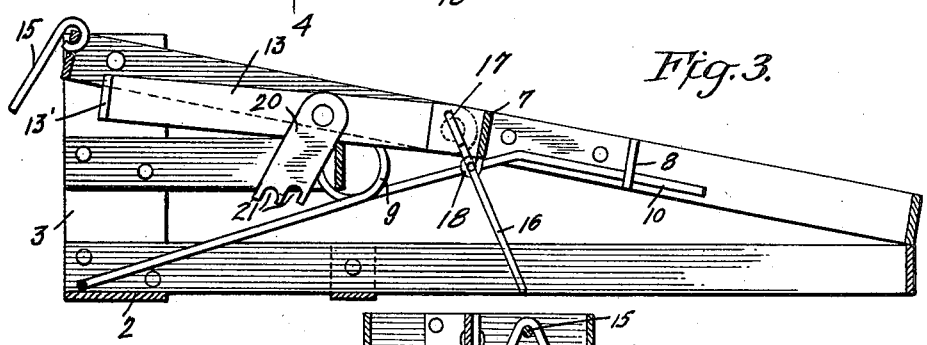
Fig. 3 is a view in longitudinal section illustrating the position of the various parts after the trap has been sprung.

A coil spring 9 is located around the intermediate portion of the bracket 6. Each end 10 of the spring 9 is operatively connected to the movable jaw 4 by inserting the ends 10 of the spring through the perforated extremities 8 of the brace 7. The wire forming the central portion of spring 9 is bent to form an integral spring tongue 11. It at all times engages the intermediate portion of the member 2. It will be seen that by thus bending the intermediate portion of the wire away from the coil to form a tongue, a portion of the bracket 6 is exposed at the central portion of the spring 9 as shown at 12, for a purpose which will hereinafter appear. The torsion of the spring 9 normally maintains the jaws in the closed position illustrated in Fig. 3.

A lever 13 is pivotally connected to a bracket 14 secured to the intermediate portion of the brace 7 and the free end of the lever is provided with a transversely positioned integral arm 13′.

A locking rod 15 is pivotally secured to the pivoted end of the movable jaw 4. A trigger 16, the upper hooked end 17 of which is adapted to engage the free end of the rod 15, has rocking mounting which will allow of rocking movement in a bearing bracket 18 secured to brace 7. The trigger forms in effect, a swinging frame and the brace 7 limits the rotary movement of the frame in the bracket 18.

The lever 13 carries a pivoted leg 20 and the free end of the leg 20 is provided with a staggered arrangement of notches 21.

Figure 2:
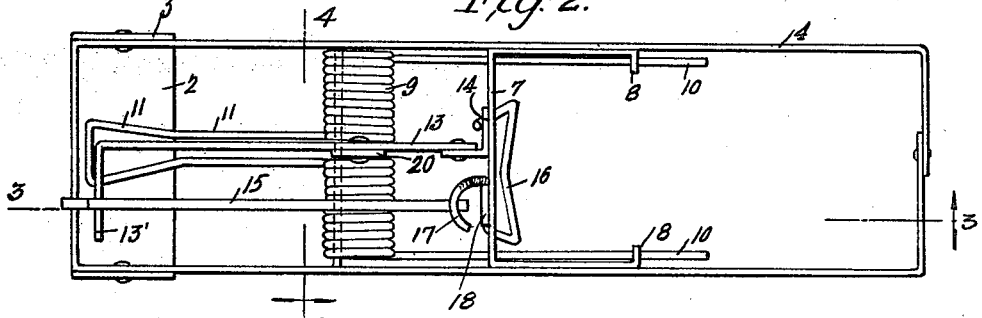
Fig. 2 is a top plan view of the trap in set position.
Figure 4:
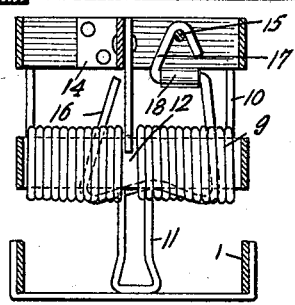
Fig. 4 is a view in transverse section on the line 4—4 of Fig. 2.

The operation is as follows: To set the trap, one of the notches 21 in the leg 20 is positioned on the bracket 6 at the portion designated as 12. The free end of the lever 13 is moved downwardly, the lever fulcruming on the leg 20 and thus raising the movable jaw 4 against the torsion of the spring 9. The locking rod 15 is swung over the arm 13′ of the lever 13 to retain the lever in position and the free end of the rod 15 is located under the hook 17 of the trigger 16. The rod 15 is of such a length that the hook 17 must be swung rearwardly to engage the free end thereof. After the operation just described, the trap will be in the set position illustrated in Figs. 1, 2 and 4. When the trap has been set it is inserted in a gopher hole with the free end of the movable jaw extending into the hole as will be readily understood. The arrangement of notches 21 on the leg 20 permits the jaws to be located in various positions of adjustment so that the trap may accommodate itself to holes of different sizes.

When an animal enters the trap and endeavors to pass therethrough, it must necessarily move the trigger 16 out of engagement with the locking rod 15, thus releasing the rod 15 and consequently the lever 13 and allowing the spring 9 to snap the jaws of the trap quickly together.

While I have illustrated one of the particular embodiments of my invention, it is obvious that various slight changes and alterations might be made in the general form of the parts described without departing from my invention, and hence I do not wish to limit myself to the precise details set forth but consider myself at liberty to make such slight changes and alterations as fairly fall within the spirit and scope of the appended claims.

I claim:

1. In a trap of the character described, a fixed jaw, a movable jaw, a spring normally holding the jaws in closed position, a lever pivotally mounted on the movable jaw, a leg carried by the lever, said lever adapted to fulcrum on said leg to raise said movable jaw, a transversely positioned arm carried by said lever, a locking arm pivoted at one end to said movable jaw adapted to engage said last mentioned arm to lock said lever in position, a trigger engaging the free end of said locking arm to maintain said jaws in open position against the torsion of said spring and means for locking the free end of said movable jaw at various distances from said fixed jaw.

2. A trap of the character stated, comprising a fixed jaw, uprights secured to one end thereof, a movable jaw pivotally connected at one end to said uprights, a U-bracket secured to said uprights between said jaws, a coil spring mounted on the intermediate portion of said bracket, a U-shaped brace carried by said movable jaw, perforated inwardly bent extremities on said brace, the ends of the spring located in said perforations and the central portion of said spring forming a spring tongue, rigid means associated with the fixed jaw engaging said spring tongue whereby the free end of said movable jaw is normally maintained in contact with said fixed jaw.

3. A trap of the character stated, comprising a fixed jaw, uprights secured to one end thereof, a movable jaw pivotally connected at one end to said uprights, a U-bracket secured to said uprights between said jaws, a coil spring mounted on the intermediate portion of said bracket, a U-shaped brace carried by said movable jaw, perforated inwardly bent extremities on said brace, the ends of the spring located in said perforations and the central portion of said spring forming a spring tongue, a rigid means associated with the fixed jaw engaging said spring tongue whereby the free end of said movable jaw is normally maintained in contact with said fixed jaw, a lever pivoted to said brace, a leg carried by said lever having a plurality of notches therein adapted to engage the intermediate portion of said bracket whereby said lever fulcrums on said leg to separate said jaws, a trigger comprising a swinging frame mounted to rock on said brace, and means engaging said lever and engageable by said trigger for locking the trap in set position.

4. A trap of the character stated comprising a fixed jaw, a U-shaped member secured at its intermediate portion to the fixed jaw and including a pair of upwardly extending arms, a movable jaw pivotally connected at one end to the upper ends of the arms, a U-bracket secured to the arms between the jaws, a coiled spring mounted on the intermediate portion of the bracket, the ends of said spring operatively connected to the movable jaw and the central portion of said spring forming a spring tongue engaging the intermediate portion of the first mentioned U-shaped member whereby the free end of said movable jaw is normally maintained in contact with said fixed jaw.

ANTON F. RENKEN.